(12) United States Patent
Tsutsui et al.

(10) Patent No.: US 7,359,842 B1
(45) Date of Patent: Apr. 15, 2008

(54) SOFT SENSOR DEVICE AND DEVICE FOR EVALUATING THE SAME

(75) Inventors: Hiroaki Tsutsui, Tokyo (JP); Junichi Tsuboi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 718 days.

(21) Appl. No.: 10/332,224

(22) PCT Filed: Jul. 6, 2000

(86) PCT No.: PCT/JP00/04497

§ 371 (c)(1),
(2), (4) Date: Jan. 3, 2003

(87) PCT Pub. No.: WO02/06953

PCT Pub. Date: Jan. 24, 2002

(51) Int. Cl.
*G06F 7/60* (2006.01)
*G06F 17/10* (2006.01)
*G06F 15/18* (2006.01)

(52) U.S. Cl. .......................................... 703/2; 706/21

(58) Field of Classification Search ............... 703/2; 706/21
See application file for complete search history.

(56) References Cited

U.S. PATENT DOCUMENTS 5,831,851 A * 11/1998 Eastburn et al. ............. 700/114
5,918,200 A * 6/1999 Tsutsui et al. .............. 702/180
6,243,696 B1 * 6/2001 Keeler et al. ................. 706/21
6,639,402 B2 * 10/2003 Grimes et al. .............. 324/239
6,876,168 B1 * 4/2005 Luo et al. .................... 318/560
6,879,971 B1 * 4/2005 Keeler et al. ................. 706/21

FOREIGN PATENT DOCUMENTS

JP          07-160662 A      6/1995

OTHER PUBLICATIONS

Tim Hanson, "Diagnosing multiple faults using knowledge about malfuctioning behavior" ACM 1988 pp. 29-36.*

(Continued)

*Primary Examiner*—Paul Rodriguez
*Assistant Examiner*—Dwin McTaggart Craig
(74) *Attorney, Agent, or Firm*—Blakely Sokoloff Taylor & Zafman

(57) ABSTRACT

A case base generator divides an input space of history data into unit input spaces according to a desired output allowable error, and creates a representative case from the history data arranged in the unit input spaces, thereby generating a case base. A case retrieving section of a soft sensor retrieves a case corresponding to new input data from the case base. An output estimating section calculates and outputs estimated output data corresponding to the new input data on the basis of the output data on the retrieved case. An output evaluating section calculates and outputs an estimation error in the estimated output data on the basis of the topological distance between the new input data and the retrieved case. A function evaluating section evaluates the soft sensor on the basis of the estimation error, the estimated output data, and true output data.

3 Claims, 15 Drawing Sheets

OTHER PUBLICATIONS

"Nonlinear Modeling Technique Using Historical Data for Case", Papers of The Society of Instrument and Control Engineers.

"Designing a Soft Sensor for a Distillation Column with the Fuzzy Distributed Radial Basis Function Neural Network" by Xudong Wang, et al.; *Proceedings of the 35th Conference on Decision and Control*; Dec. 1996; Kobe, Japan; pp. 1714-1719.

"Neural Network Based Softsensor for a Tubular Reactor" by Marius Anghelea, et al.; *Proceedings of the 7th Mediterranean Conference on Control and Automation*; Jun. 28-30, 1999; Haifa, Israel; pp. 524-538.

"Nonlinear Modeling Technique Using Historical Data for Case" by Hiroaki Tsutsui, et al.; TCBM: Topological Case Based Modeling; *SICE*, vol. 33, No. 9, 947/954; 1997; pp. 947-954, Abstract.

"Nonlinear Modeling Technique Using Historical Data for Case", Papers of The Society of Instrument and Control Engineers May 30, 1997.

* cited by examiner

OUTPUT DISTRIBUTION CONDITION: |OUTPUT DISTRIBUTION WIDTH| < ALLOWABLE WIDTH ε OF OUTPUT ERROR

CONTINUITY CONDITION: |y-y'| < ALLOWABLE WIDTH (r + 1) ε OF OUTPUT ERROR

| INDEX | COMPARISON WITH EVALUATION REFERENCE | |
|---|---|---|
| | VERY LOW | LOW |
| OUTPUT DISTRIBUTION CONDITION SUFFICIENCY RATIO | REVIEWING OF INPUT VARIABLE SELECTION | REVIEWING OF NOISE PROCESSING FOR HISTORY DATA |
| CONTINUITY CONDITION SUFFICIENCY RATIO | REVIEWING OF MEASUREMENT POINT WITH RESPECT TO HISTORY DATA | REVIEWING OF NOISE PROCESSING FOR HISTORY DATA |

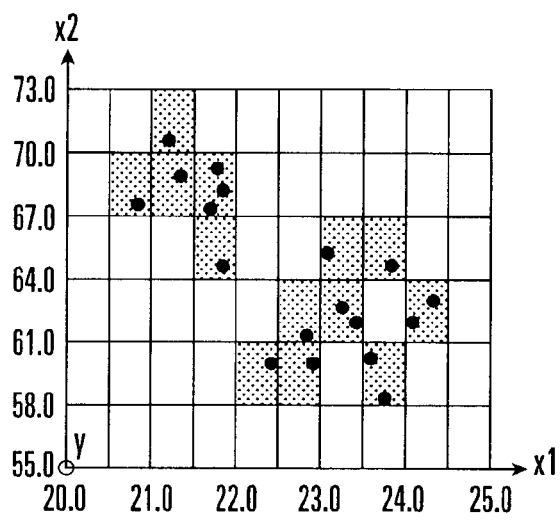
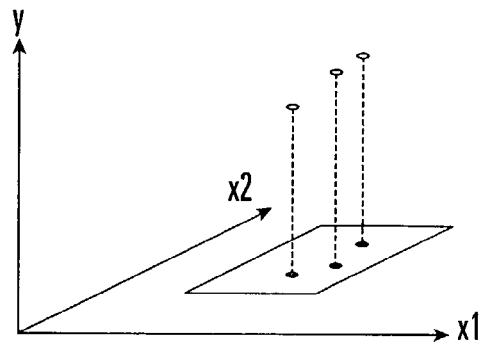
SET OF DATA IN SINGLE MESH
| x1 | x2 | y |
|---|---|---|
| 21.6 | 67.5 | 82.3 |
| 21.8 | 69.6 | 81.1 |
| 21.9 | 68.7 | 80.7 |
INTEGRATING DATA IN SINGLE MESH INTO ONE CASE
AVERAGING OF OUTPUT VALUES
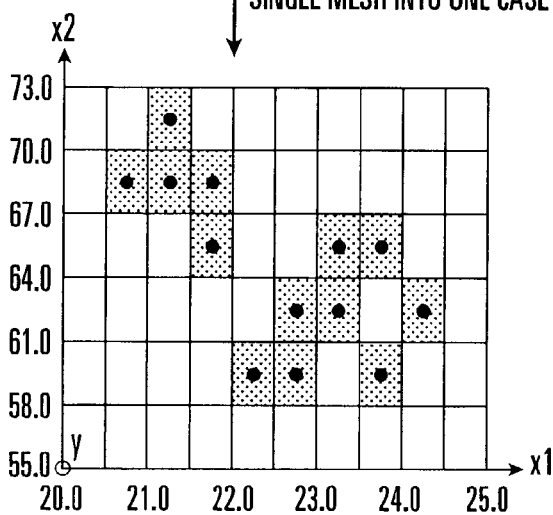
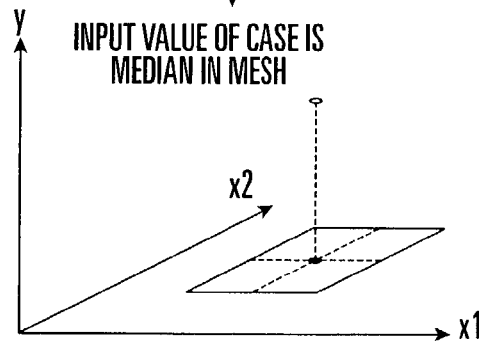
INPUT VALUE OF CASE IS MEDIAN IN MESH
CASE GENERATED BY INTEGRATION
| x1 | x2 | y |
|---|---|---|
| 21.8 | 68.5 | 81.3 |
FIG.11

NEW DATA: B(23.9, 66.8, 48.2)
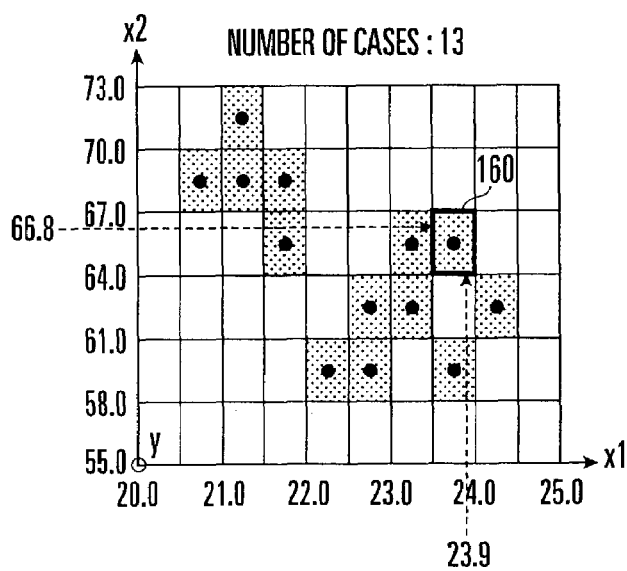
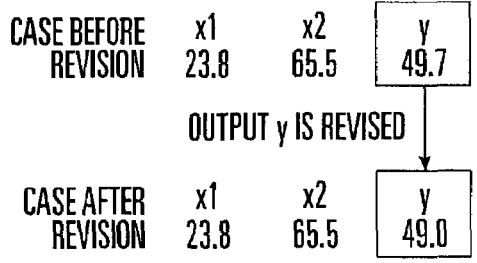
ONLY OUTPUT y OF CASE IN MESH TO WHICH NEW DATA B BELONGS IS REVISED
: OUTPUT REVISION ARITHMETIC EXPRESSION
$$Y_{new} = (1.0 - C_{Forget}) \times Y_{old} + C_{Forget} \times Y$$
$Y_{new}$ : OUTPUT VALUE AFTER REVISION
$Y_{old}$ : OUTPUT VALUE BEFORE REVISION
$Y$ : OUTPUT VALUE OF NEW DATA
$C_{Forget}$ : FORGETTING FACTOR
FIG. 17

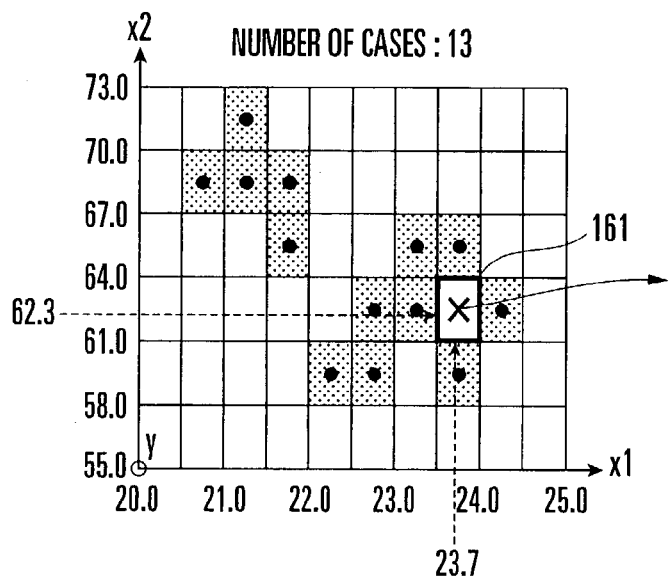
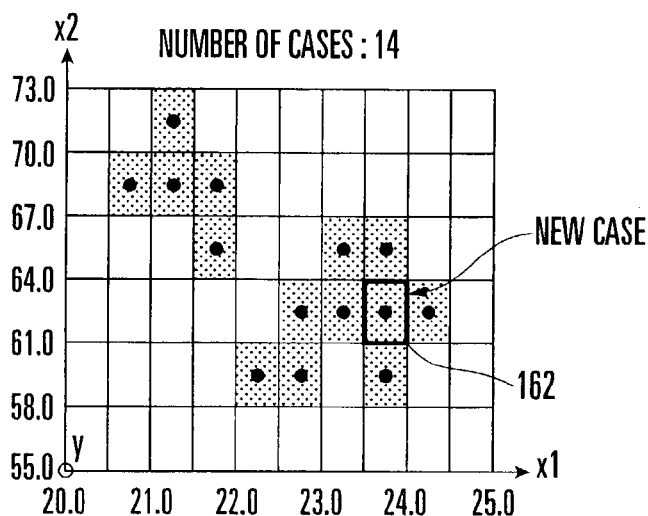
FIG. 18

CONDITION ①

$|Y - Y_{OUT}| \leq (r+1)\varepsilon \ (=d)$

WHERE $Y_{OUT}$ : OUTPUT DATA (TRUE VALUE)
$Y$ : ESTIMATED OUTPUT DATA
$r$ : SIMILARITY
$\varepsilon$ : OUTPUT ERROR ALLOWABLE WIDTH
$d$ : ESTIMATION ERROR

CONDITION ②

$|Y - Y_{OUT}| > (r+1)\varepsilon \ (=d)$

WHERE $Y_{OUT}$ : OUTPUT DATA (TRUE VALUE)
$Y$ : ESTIMATED OUTPUT DATA
$r$ : SIMILARITY
$\varepsilon$ : OUTPUT ERROR ALLOWABLE WIDTH
$d$ : ESTIMATION ERROR

FIG. 19

| CONDITION TO BE HELD | EVALUATION RESULT | CONCRETE EVALUATION RESULT |
|---|---|---|
| CONDITION ① | PROPERLY FUNCTIONING | ENCOURAGEMENT OF ADAPTIVE LEARNING |
| CONDITION ② | NO PROPERLY FUNCTIONING | POSSIBILITY OF TEMPORARY NOISE : REVIEWING OF OUTPUT ERROR ALLOWABLE WIDTH AND INPUT VARIABLE SELECTION |

SOFT SENSOR DEVICE AND DEVICE FOR EVALUATING THE SAME

The present patent application is a non-provisional application of International Application No. PCT/JP00/04497, filed Jul. 6, 2000.

TECHNICAL FIELD

The present invention relates to an application of case-based reasoning which imports the concept of topology and, more specifically, a soft sensor which estimates output data actually detected from an identification target by using case-based reasoning and a device for evaluating the soft sensor.

BACKGROUND ART

In general, a reasoning system for estimating output data to be actually detected from an identification target by using a reasoning engine is called a soft sensor because it estimates a physical quantity by arithmetic processing instead of actually detecting a physical quantity like a hard sensor.

As an application of this soft sensor, for example, a system for monitoring the amounts of emissions such as NOx and SOx contained in an exhaust gas from a combustion apparatus by using a neural network is disclosed (see, e.g., JP 9-504346). This system estimates the amounts of emissions such as NOx and SOx discharged from a combustion apparatus by using a neural network using various physical quantities detected by hard sensors as input variables, thereby monitoring the amounts of emissions contained in an exhaust gas instead of using hard sensors for directly and physically detecting these emissions or adjusting these sensors.

In such a conventional soft sensor, however, since a target is identified by using a neural network, the following problems arise when the soft sensor is actually used. First of all, since the neural network involves the model restructuring problem due to its model structure, a relatively long period of time is required for learning. This makes it impossible to follow up changes in targets in real time. It is therefore difficult to meet the expectation that the soft sensor be used instead of a hard sensor for measuring a target exhibiting large changes, e.g., NOx.

In addition, in the case of a neural network, although a statistical evaluation value (average error) can be given to estimated output data, when a soft sensor is actually used, an appropriate evaluation error value cannot be given to estimated output data because of the handling of new input data. Furthermore, when the soft sensor is put into practice, an error in estimated output data cannot be evaluated in real time, and whether the soft sensor is properly functioning cannot be evaluated.

The following problems arise when a target model is created. First of all, in the case of a neural network, as in linear or nonlinear regression model, an input/output relationship must be established throughout the entire input and output spaces from history data according to a predetermined algorithm. However, most of the history data obtained by actual measurement are records of specific states of identification targets. In many cases, therefore, a function shape in the entire input and output spaces is unknown, and hence the consistency between a target and the model created from prepared history data cannot be evaluated. Moreover, when estimation fails, it cannot be determined whether the cause of the failure lies in the shortage of history data used for the creation of the model or a defect in the model design such as the selection of input variables and hierarchical structure.

DISCLOSURE OF INVENTION

In order to solve the above problems, according to the present invention, there is provided a soft sensor which arithmetically processes a set of input data obtained for a plurality of input variables representing a behavior of a target by using a predetermined reasoning model to estimate output data actually detected from the target in accordance with the set of input data, and outputs the data as estimated output data, including a case base generated by receiving a plurality of history data each constituted by a set of input data obtained for a plurality of input variable required for estimation and actual output data obtained from the target by using the input data as input conditions, forming a plurality of unit input spaces by quantizing an input space of the case base in accordance with a desired output allowable error, arranging the respective history data in the corresponding unit input spaces, and generating, for each unit input space having not less than one history data, a case representing the history data in the unit input space, a case retrieving section which acquires, by searching the case base, a case from each of not less than one unit input space which has a case and is located at a minimum topological distance from a unit input space corresponding to a new set of input data, and an output estimating section which estimates output data corresponding to the new set of input data. This output estimating section calculates output data corresponding to the new set of input data from the output data of the case retrieved by the case retrieving section and outputs the data as estimated output data. The soft sensor further includes an output evaluating section which calculates an error contained in the estimated output data. The output evaluating section calculates an error contained in the estimated output data output from the output estimating section on the basis of the output allowable error and a topological distance between the unit input space corresponding to the new set of input data and the unit input space of the case retrieved by the case retrieving section, and outputs the error as an estimation error corresponding to the estimated output data. The soft sensor also includes a function evaluating section to evaluate whether the soft sensor is properly functioning, by using the estimation error from the output estimating section, the estimated output data from the output estimating section, and the output data of the true value obtained from the target.

According to the present invention, the case retrieving section acquires a case from each of one or more unit input spaces each of which is located at the minimum topological distance from the unit input space corresponding to the new set of input data and includes a case, and the output estimating section calculates output data corresponding to the new set of input data from the output data of the case retrieved by the case retrieving section, and outputs the data as estimated output data. In addition, the output evaluating section calculates an estimation error and outputs it for each estimated output data. The function evaluating section evaluates whether the soft sensor is properly functioning.

In addition, according to the present invention, there is provided a soft sensor evaluating device for evaluating a soft sensor which arithmetically processes a set of input data obtained for a plurality of input variables representing a behavior of a target by using a predetermined reasoning model to estimate output data actually detected from the target in accordance with the set of input data, and outputs the data as estimated output data, including an evaluation case base which is used when a reasoning model for the soft sensor is to be generated and generated by receiving a plurality of history data each constituted by a set of input data obtained for a plurality of input variable required for estimation and actual output data obtained from the target by using the input data as input conditions, forming a plurality of unit input spaces by quantizing an input space of the case base in accordance with a desired output allowable error, arranging the respective history data in the corresponding unit input spaces, and generating, for each unit input space having not less than one history data, a case representing the history data in the unit input space, a case retrieving section which acquires, by searching the evaluation case base, a case from each of not less than one unit input space which has a case and is located at a minimum topological distance from a unit input space corresponding to a new set of input data input to the soft sensor, an output estimating section which calculates output data corresponding to the new set of input data from the output data of the case retrieved by the case retrieving section and outputs the data as evaluated estimated output data, an output evaluating section which calculates an error contained in the estimated output data output from the output estimating section on the basis of the output allowable error and a topological distance between the unit input space corresponding to the new set of input data and the unit input space of the case retrieved by the case retrieving section, and concurrently outputs the error as an evaluation estimation error for each estimated output data, and a function evaluating section which evaluates the soft sensor. The function evaluating section evaluates whether the soft sensor is properly functioning, by using the evaluation estimation error from the output evaluating section, the evaluated estimated output data from the output estimating section, and output data of a true value obtained from the target. In addition, the soft sensor evaluating device includes the function evaluating section to evaluate whether the soft sensor is properly functioning, by comparing a difference between the evaluated estimated output data obtained by the output estimating section in correspondence with the new set of input data and the output data of the true value obtained from the target with the evaluation estimation error corresponding to the evaluated estimated output data.

According to the present invention, the case retrieving section acquires a case from each of one or more unit input spaces each of which is located at the minimum topological distance from the unit input space corresponding to the new set of input data and includes a case, and the output estimating section calculates output data corresponding to the new set of input data from the output data of the case retrieved by the case retrieving section, and outputs the data as evaluated estimated output data. The output evaluating section then calculates an estimation error and concurrently outputs it for each estimated output data. The function evaluating section indirectly evaluates whether the soft sensor is properly functioning.

According to the present invention, there is provided another soft sensor evaluating device for evaluating a soft sensor which arithmetically processes a set of input data obtained for a plurality of input variables representing a behavior of a target by using a predetermined reasoning model to estimate output data actually detected from the target in accordance with the set of input data, and outputs the data as estimated output data, including an input quantizing section which receives a plurality of history data each constituted by a set of input data obtained for a plurality of input variables required for estimation and actual output data obtained from a target by using the input data as input conditions, and forms a plurality of unit input spaces by quantizing an input space of a case base in accordance with a desired output allowable error, output distribution condition determining means for determining whether each of the unit input spaces formed by the input quantizing section satisfies a condition that a variation in output data between history data arranged in the unit input space falls within a desired output allowable error, and calculates and outputs a sufficiency ratio of unit input spaces satisfying the condition as an output distribution condition sufficiency ratio, and continuity condition determining means for determining whether each of the unit input spaces formed by the input quantizing section satisfies a condition that a difference between output data of representative history data representing history data arranged in the unit input space and an average value of output data of representative history data of not less than one unit input space which is located at a minimum topological distance from the unit input space and in which history data is arranged falls within an output allowable error corresponding to the topological distance, and calculates and outputs a sufficiency ratio of unit input spaces satisfying the condition as a continuity condition sufficiency ratio. The input quantizing section evaluates the reasoning model generated by using the history data on the basis of the output distribution condition sufficiency ratio and continuity condition sufficiency ratio.

According to the present invention, the input quantizing section receives history data and generates a plurality of unit input spaces by quantizing an input space of a case base in accordance with a desired output allowable error, and the output distribution determining means and continuity condition determining means respectively calculate an output distribution condition sufficiency ratio and continuity condition sufficiency ratio as evaluation indexes. The input quantizing section then evaluates the reasoning model generated by using the history data on the basis of these evaluation indexes.

BRIEF DESCRIPTION OF DRAWINGS

FIG. 11 is a view for explaining case generation processing;

FIG. 17 is a view for explaining adaptive learning operation (when a corresponding case exists);

FIG. 18 is a view for explaining adaptive learning operation (when no corresponding case exists);

FIG. 19 is a view for explaining conditions used for the evaluation of the function of a soft sensor;

FIG. 20 is a view for explaining the relationship between each condition and an evaluation result.

BEST MODE OF CARRYING OUT THE INVENTION

Embodiments of the present invention will be described next with reference to the accompanying drawings.

First Embodiment

Figure 1:
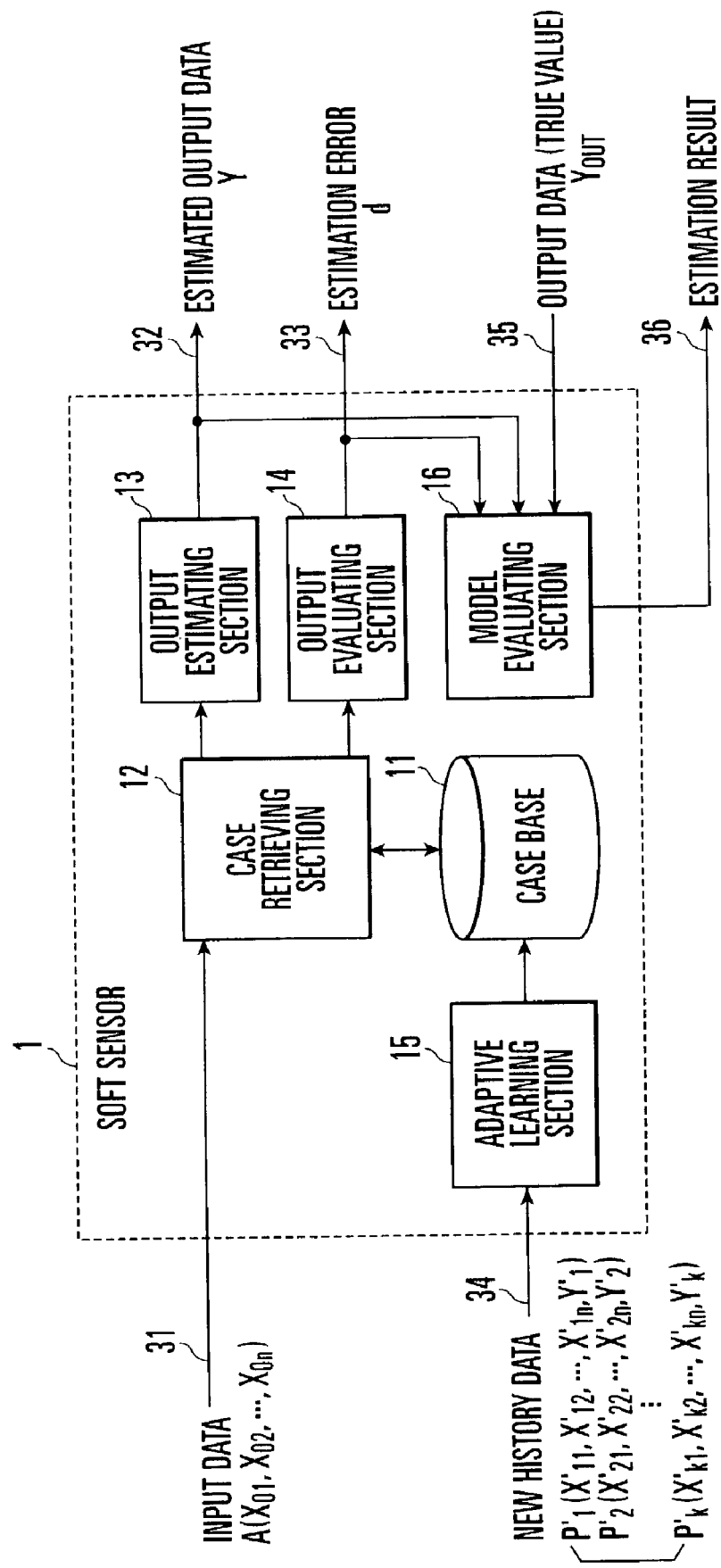
FIG. 1 is a functional block diagram showing a soft sensor according to the first to third embodiments of the present invention.

FIG. 1 is a functional block diagram showing a soft sensor according to the first embodiment of the present invention. A soft sensor 1 includes a case base 11, case base retrieving section 12, output estimating section 13, output evaluating section 14, adaptive learning section 15, and function evaluating section 16. The case base 11 is generated by a case base generator 2 (to be described later) on the basis of the history data actually obtained from the behavior of a target whose output data is estimated by the soft sensor 1. This case base 11 is a case base generated by importing the concept of topology, in which an input space is quantized in accordance with a desired output allowable error (required precision), and an input/output relationship is defined for each unit input space (to be referred to as a mesh hereinafter).

The case retrieving section 12 selects a mesh corresponding to new input data A (31) by referring to this case base 11, and retrieves a case representing each mesh from the selected mesh or its surrounding mesh. This input data A is constituted by values $X_{01}$ to $X_{0n}$ of n input variables $x_1$ to $x_n$ like input data X of history data used for the generation of the case base 11. The output estimating section 13 calculates and outputs estimated output data Y (32) corresponding to the new input data A from the output data of at least one case retrieved by the case retrieving section 12. The adaptive learning section 15 adaptively learns the case base 11 on the basis of new history data 34 actually obtained from the behavior of the target. The new history data 34 has the same configuration as that of history data used for the generation of the case base 11, but is constituted by data which are not used as history data. For example, the data obtained by actual measurement from the target after the soft sensor 1 begins to be used is used. In this case, as new history data P', k (k is a positive integer) new history data $P'_1$ to $P'_k$ are prepared.

The output evaluating section 14 evaluates and outputs an estimation error d (33) contained in the estimated output data Y for each estimated output data Y on the basis of a similarity indicating that at least one case retrieved by the case retrieving section 12 is a case of a mesh separated away from the mesh corresponding to the input data A by a specific distance, and a given desired output allowable error (required precision) which is one of the modeling conditions used for the generation of the case base. The function evaluating section 16 evaluates, by using the estimation error d, the estimated output data Y, and output data $Y_{OUT}$ (35) of the true value obtained from the target by actual measurement, whether the soft sensor is functioning properly, and outputs an estimation result 36.

Generation of Case Base: Case Base Generator and Case Base

Figure 2:
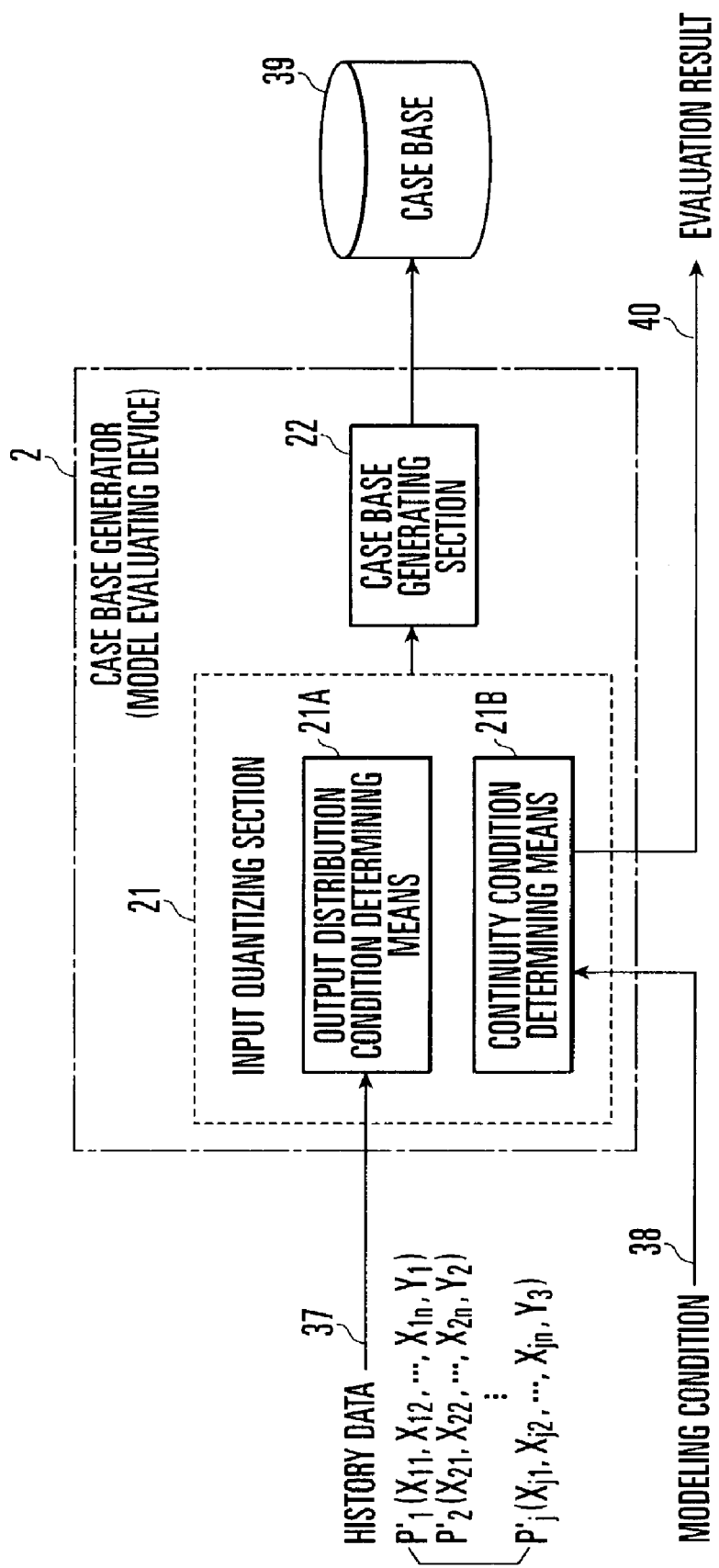
FIG. 2 is a functional block diagram showing a case base generator.

The case base generator will be described next with reference to FIG. 2. FIG. 2 is a functional block diagram showing the case base generator. The case base 11 used in the soft sensor 1 is generated in advance by the case base generator 2 using history data 37. This case base generator 2 includes an input quantizing section 21 and case base generating section 22. The history data 37 is constituted by a combination of a plurality of input data X used for estimation and output data Y actually measured when the input data X are input to the target. In this case, as the input data X, n (n is an integer equal to or more than 2) input variables $x_1$ to $x_n$ are selected. As the history data 37, j (j is an integer equal to or more than 2) history data $P_1$ to $P_j$ are prepared.

The input quantizing section 21 defines a mesh by quantizing an input space of a case base on the basis of the history data 37 and a desired modeling condition 38. The input quantizing section 21 includes an output distribution condition determining means 21A and continuity condition determining means 21B. A quantization level for an input space is selected on the basis of the determination results obtained by these determining means 21A and 21B. The case base generating section 22 distributes the history data 37 to the respective meshes, and calculates a case representing each mesh, thereby generating a case base 39. This case base 39 is used as, for example, the case base 11 of the soft sensor 1 and an evaluation case base 51 (see FIG. 21) of an evaluating device 5 (to be described later). When the evaluation case base 51 is to be generated, in particular, since the evaluation case base 51 is generated on the basis of history data 63 used to generate a reasoning model for the soft sensor, the case base generator 2 also functions as a device for determining whether the target can be modeled with a desired precision by using the case data, i.e., a device for evaluating the soft sensor (to be described later).

Figure 3:
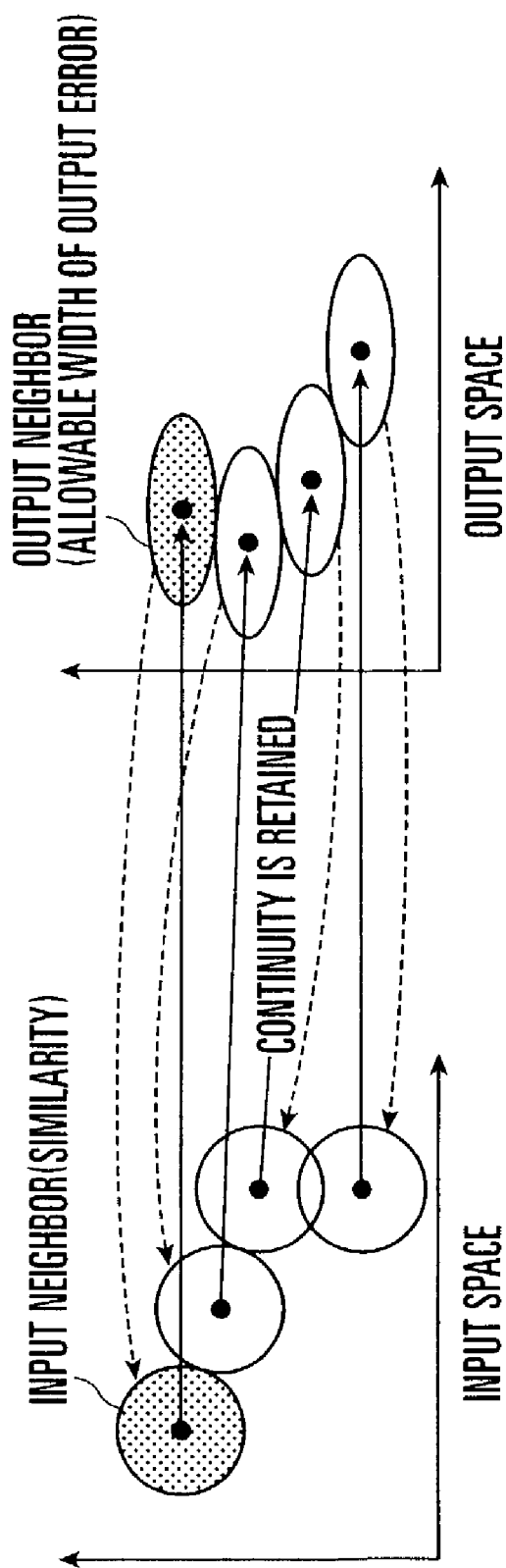
FIG. 3 is a view for explaining the concept of topology used for a case-based reasoning model according to the present invention.
Figure 4:
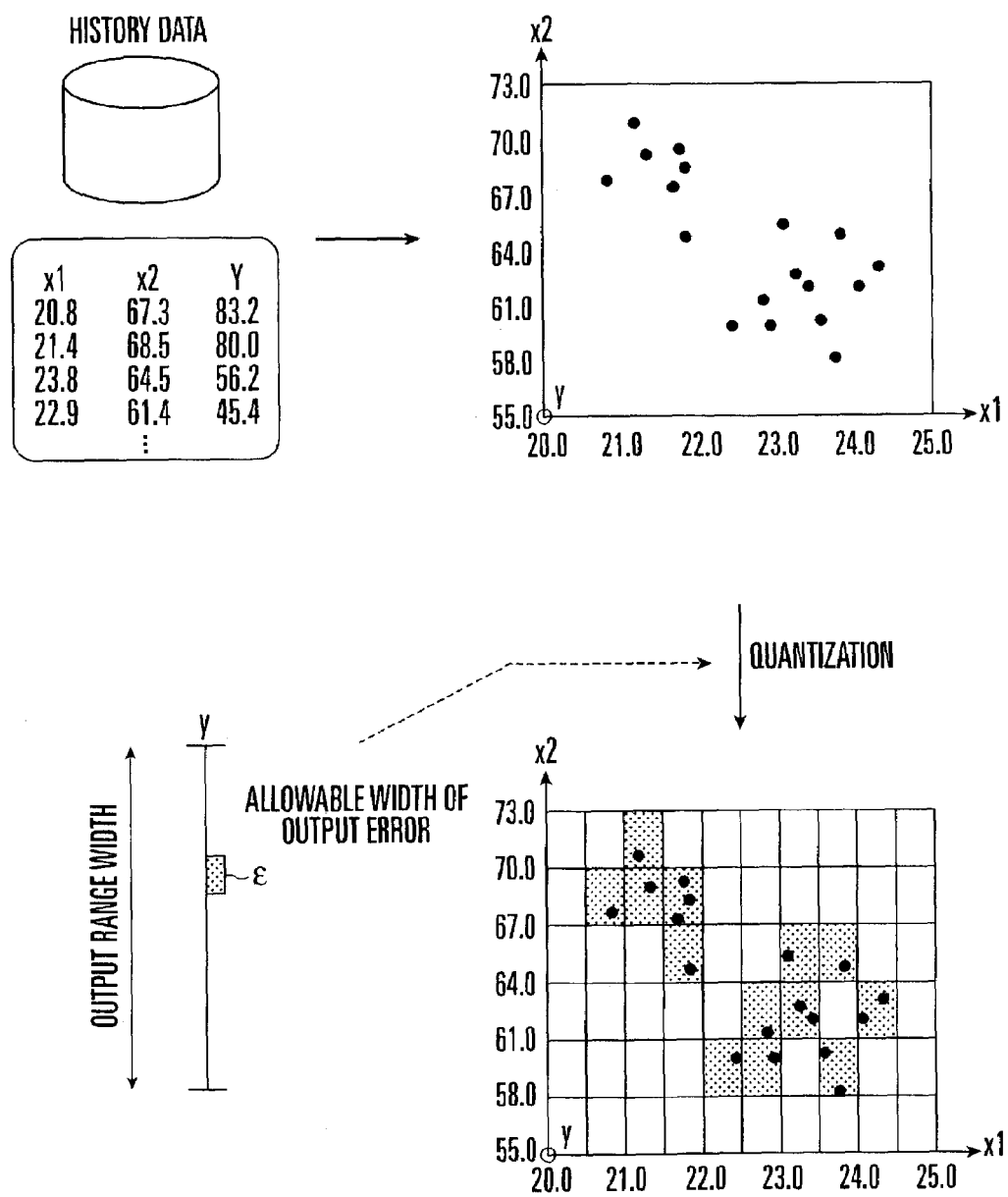
FIG. 4 is a view for explaining quantization processing for an input space.
Figure 5:
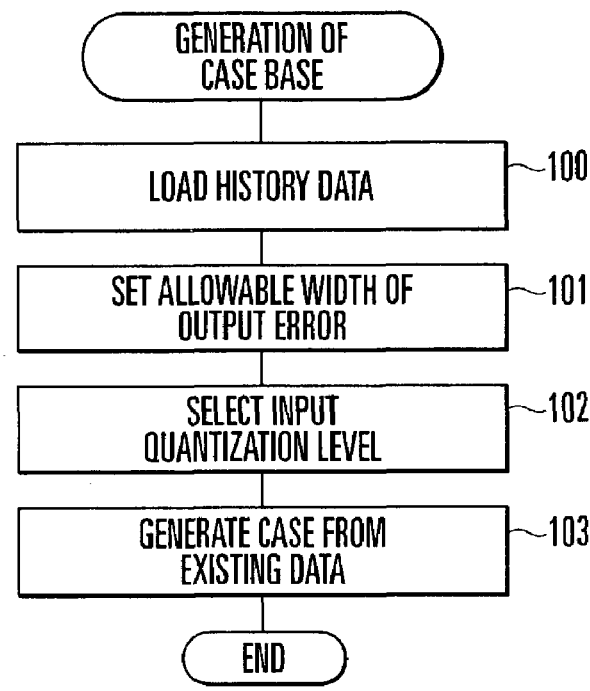
FIG. 5 is a flow chart showing case base generation processing.

The case base used in the present invention and the operation of the case base generator therefor will be described below FIG. 3 is a view for explaining the concept of topology used in a case-based reasoning model according to the present invention. FIG. 4 is a view for explaining quantization processing for an input space. FIG. 5 is a flow chart showing case base generation processing.

(Case-Based Reasoning Model)

According to the case-based reasoning model used in the present invention, an input space is quantized into a topological space on the basis of the concept of continuous mapping in mathematical topology, thereby generally defining a case base corresponding to an allowable width ε (output allowable error) which is a required precision and similarity.

According to the concept of continuous mapping in topology, a necessary and sufficient condition for allowing map f: X→Y to be continuous in spaces X and Y is that open set (output neighbor) O inverse map f−1(O) in Y is equivalent to an open set (input neighbor) in X. Assuming that the map f from an input space to an output space is continuous according to the concept of this continuous mapping, as shown in FIG. 3, an output neighbor is determined by using the allowable width of an output error in the output space. This makes it possible to associate the output neighbor with an input neighbor that satisfies the allowable width of the output error. With this operation, the input space can be quantized and grasped as a topological space.

(Quantization of Input Space)

In the present invention, this input space quantization processing is done in the manner shown in FIG. 4. History data is constituted by a combination of input data and output data obtained in the past. In this case, history data is constituted by inputs $x_1$ and $x_2$ and an output y. These history data are distributed in an input space $x_1$-$x_2$ as indicated by the upper right portion of FIG. 4. When the data is to be quantized with meshes which have predetermined widths, respectively, in the $x_1$ and $x_2$ directions and are arranged at equal intervals, as indicated by the lower right portion of FIG. 4, the size of each mesh, i.e., an input quantization level, is determined in consideration of an allowable width $\epsilon$ of an output error, as indicated by the lower left portion of FIG. 4. The allowable width $\epsilon$ of the output error is a value indicating the degree to which the error between an output obtained by reasoning and an unknown true value corresponding to new input data is allowed, and is set as a modeling condition in advance. By determining a mesh size by using this allowable width $\epsilon$, therefore, an input neighbor corresponding to the size of an output neighbor, i.e., a case, can be defined, and the error of output data inferred from all input data belonging to the case satisfies the allowable width $\epsilon$ of the output error.

The case base generator 2 generates the case base 39 by quantization processing in such an input space. Referring to FIG. 5, the history data 37 is loaded (step 100), and modeling conditions such as the allowable width $\epsilon$ of an output error are set (step 101). Each type of evaluation index is calculated on the basis of the allowable width $\epsilon$, and an input quantization level is selected for each input variable on the basis of this evaluation index (step 102). Each case constituting the case base 39 is then generated from the history data 37 distributed to the respective meshes (step 103).

(Determination of Input Quantization Level)

Figure 6:
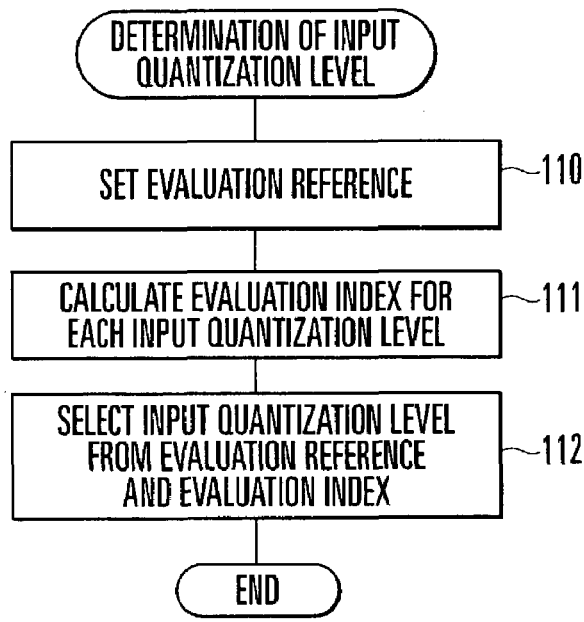
FIG. 6 is a flow chart showing input quantization level determination processing.
Figure 7:
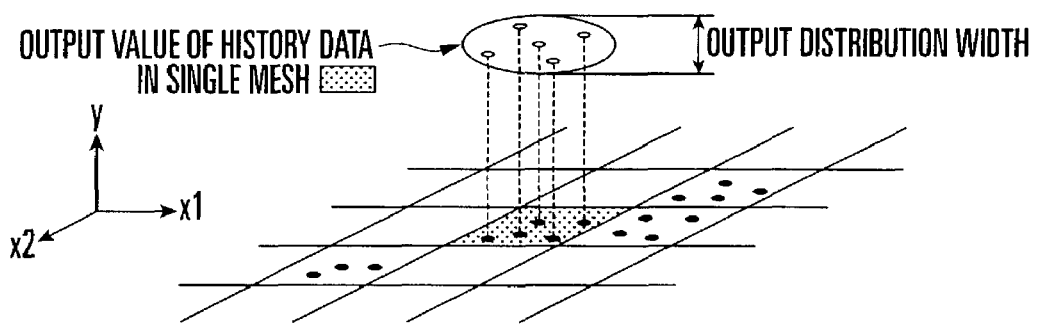
FIG. 7 is a view for explaining an output distribution condition.
Figure 8:
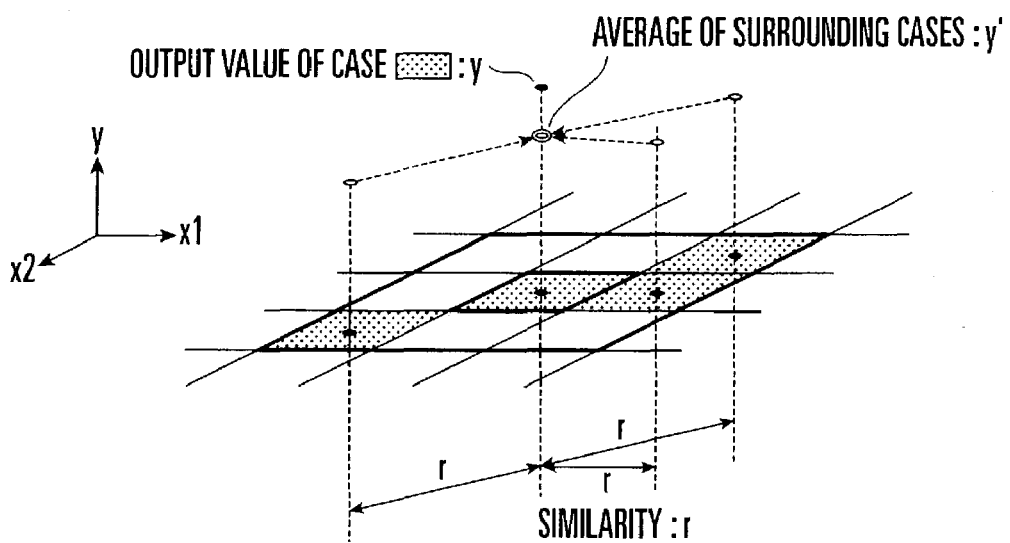
FIG. 8 is a view for explaining a continuity condition.
Figures 9, 10:
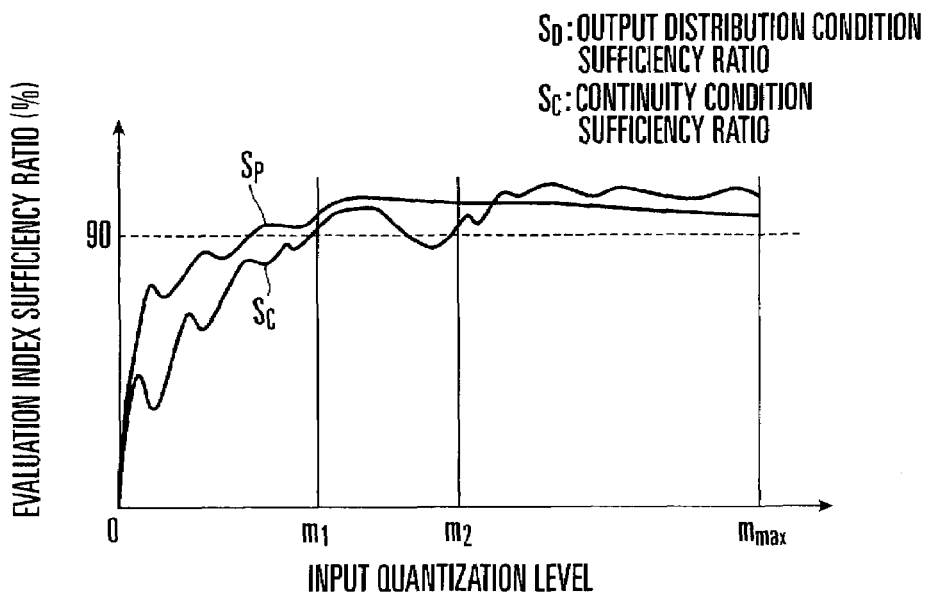
FIG. 9 is a view for explaining changes in evaluation indexes.
FIG. 10 is a view for explaining an evaluation reference for modeling evaluation.

Input quantization level determination processing using an evaluation index will be described with reference to FIGS. 6 to 9. FIG. 6 is a flow chart showing input quantization level determination processing. FIG. 7 is a view for explaining an output distribution condition which is one of evaluation indexes. FIG. 8 is a view for explaining a continuity condition which is one of the evaluation indexes. FIG. 9 is a view for explaining the relationship between each evaluation index sufficiency ratio and a corresponding input quantization level.

The output distribution condition is a condition that with respect to an arbitrary mesh obtained by quantizing the input space with the selected input quantization level, the output distribution width of an output y of history data belonging to the mesh is smaller than the allowable width $\epsilon$ of the output error, as shown in FIG. 7. With this condition, it is checked whether one mesh, i.e., an input neighbor, satisfies a condition determined at the corresponding output neighbor, i.e., the allowable width $\epsilon$ of the output error. The continuity condition is a condition that with respect to an arbitrary mesh obtained by quantizing the input space with the selected input quantization level, the difference between an output value y of a case generated with the mesh and an average output value y' of a surrounding case exiting around the case and a similarity r is smaller than the allowable width $\epsilon$ of the output error, as shown in FIG. 8.

With this condition, it is checked whether the difference in output value between the respective cases, i.e., the input neighbors, satisfies the condition determined between the corresponding output neighbors, i.e., the allowable width $\epsilon$ of the output error. When this continuity condition is satisfied, it can be determined that the respective cases cover the input space so as to continuously satisfy a desired precision. In checking this continuity condition, consideration needs to be given to the distance between the case of the check target mesh and the surrounding case, i.e., the similarity r (to be described later). This consideration is required to properly reflect the concept of continuous mapping in topology in the operation. In this case, since the output error allowable width in a mesh is within $\epsilon$, if the similarity between two cases is r, the output error allowable width is within $\epsilon(r+1)$. The above continuity condition is therefore that the difference between the output value y of a case generated in an arbitrary mesh and the average output value y' of surrounding cases with the similarity r with respect to the case be smaller than the output error allowable width $\epsilon(r+1)$.

In input quantization level determination processing, an evaluation reference (threshold) is set first as a reference for the determination of the validity of an evaluation index (step 110), as shown in FIG. 6. An evaluation index is calculated for each input quantization level (step 111). The obtained evaluation index is compared with the evaluation reference to select one of input quantization levels by which an evaluation index that satisfies the evaluation reference (step 112). As the evaluation reference, an input quantization level is preferably selected, by which 90% cases or more satisfy the output distribution condition and continuity condition. In this system, a division number of 90% or 95% is displayed. These values 90% and 95% are considered to be statistically proper values.

Input quantization levels are sequentially determined for the respective input variables. If, for example, input variables are $x_1, x_2, \ldots, x_n$, input quantization levels are sequentially determined from $x_1$ to $x_n$. In this case, when an evaluation index is to be calculated, an input quantization level must be assigned to all input variables. In obtaining an evaluation index associated with $x_i$, therefore, the input quantization level that has already been determined at this time is used for $x_1$ to $x_{i-1}$, and the same input quantization level as that for $x_i$ is used with respect to $x_{i+1}, \ldots, x_n$ after $x_i$.

With regard to each of the output distribution condition and continuity condition of the conditions descried above, the ratio of cases that satisfy the condition to all the cases, i.e., an evaluation index sufficiency ratio, is used as an evaluation index. For example, an evaluation index value for an input quantization level m associated with $x_i$ is obtained by the ratio of cases that satisfy the evaluation index condition to all the cases generated by quantizing the input range widths of $x_1, x_2, \ldots, x_n$ with the respective input quantization levels, i.e., the output distribution condition sufficiency ratio and continuity condition sufficiency ratio. With regard to the input variable $x_i$, one of input quantization levels by which all these evaluation index values clear the evaluation reference is selected and determined as an input quantization level for the input variable $x_i$.

At this time, the evaluation indexes for an output distribution condition sufficiency ratio $S_D$ and continuity condition sufficiency ratio $S_C$ do not monotonously increase with an increase in the input quantization level m, but parabolically increase with a certain vertical width, as shown in FIG. 9. For this reason, there is a case wherein these evaluation indexes short fall of the evaluation reference with respect to a given input quantization level m again and then satisfy the evaluation reference as indicted by $m_2$. In this case, an optimal input quantization level can be selected independently of a maximum value $m_{max}$ by selecting a minimum quantization level $m_1$, of preset check input quantization levels up to the maximum value $m_{max}$, with which the respective evaluation indexes of the output distribution condition sufficiency ratio $S_D$ and continuity condition sufficiency ratio $S_C$ satisfy the evaluation reference. In addition, the number of meshes can be minimized, and hence the size of a case base can be decreased.

(Modeling Evaluation)

In determining a input quantization level in this manner, by determining indexes, i.e., an output distribution condition sufficiency ratio and continuity condition sufficiency ratio, on the basis of an evaluation reference like the one shown in FIG. 10, it can be evaluated whether the target can be modeled with a desired precision by using the history data. If at least one of the evaluation indexes of the output distribution condition sufficiency ratio and continuity condition sufficiency ratio cannot satisfy the evaluation reference, the input quantizing section 21 determines that estimation cannot be done with the desired output error allowable width by using the case base generated from the history data 37, and evaluates that modeling cannot be done with the required precision.

In this case, a concrete evaluation result can be selected, as shown in FIG. 10. If, for example, the output distribution condition sufficiency ratio is much lower than the evaluation reference, it is expected that variations in the history data 37 included in some meshes in the case base are larger than the desired output error allowable width. It is therefore determined that with the existing input variables, some history data used for the generation of the case base will belong to different populations with a high possibility, and these cases cannot be handled as the same mesh, and it can be evaluated that input variable selection must be reviewed. If the output distribution condition sufficiency ratio is lower than the evaluation reference to a certain degree, it is determined that variations in cases included in the same mesh are caused by noise with a high possibility, and it can be evaluated that noise removal processing for the history data 37 must be reviewed.

If the continuity condition sufficiency ratio is much lower than the evaluation reference, it is determined that meshes in which cases exist in the case base are discrete, and there is a high possibility that the history data 37 are insufficient. In this case, it can be evaluated that the measurement point must be reviewed to correct the deviation of the history data 37. If the continuity condition sufficiency ratio is lower than the evaluation reference to a certain degree, it is determined that the deviation of the history data 37 is caused by noise with a high possibility, and it can be evaluated that noise removable processing for the history data 37 must be reviewed.

In this manner, the input quantizing section 21 determines an output distribution condition sufficiency ratio and continuity condition sufficiency ratio, and evaluates whether the target can be modeled with a desired precision by using the history data, thereby output an evaluation result 40. If, therefore, modeling cannot be done with the required precision at the time of the generation of a case base, concrete measures can be taken on the basis of the evaluation result 40.

(Generation of Case)

Figure 12:
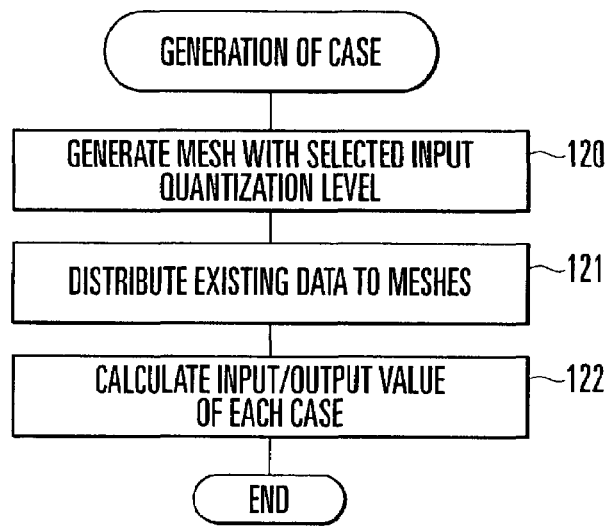
FIG. 12 is a flow chart showing case generation processing.

In the case base generator 2, an input quantization level is selected in the above manner, and each history data is distributed to each input space quantized with the input quantization level, each mesh in this case, thereby generating a case. FIG. 11 is a view for explaining case generation processing. FIG. 12 is a flow chart showing case generation processing.

First of all, meshes are generated by quantizing (dividing) each input variable on the basis of a selected input quantization level (step 120). Referring to FIG. 11, the input variable $x_1$ is divided by 10, and the input variable $x_2$ is divided by 6. The respective history data are distributed to the respective meshes (step 121). Meshes in which the history data exist are selected as cases, and input and output values in the meshes are calculated (step 122). When three history data are distributed to a single mesh as indicated by the upper right portion of FIG. 11, they are integrated into one case, as indicated by the lower right portion of FIG. 11. In this case, the average of outputs y of the three history data is used as an output value representing the case, and a median in the mesh is used as an input value representing the case.

Figure 13:
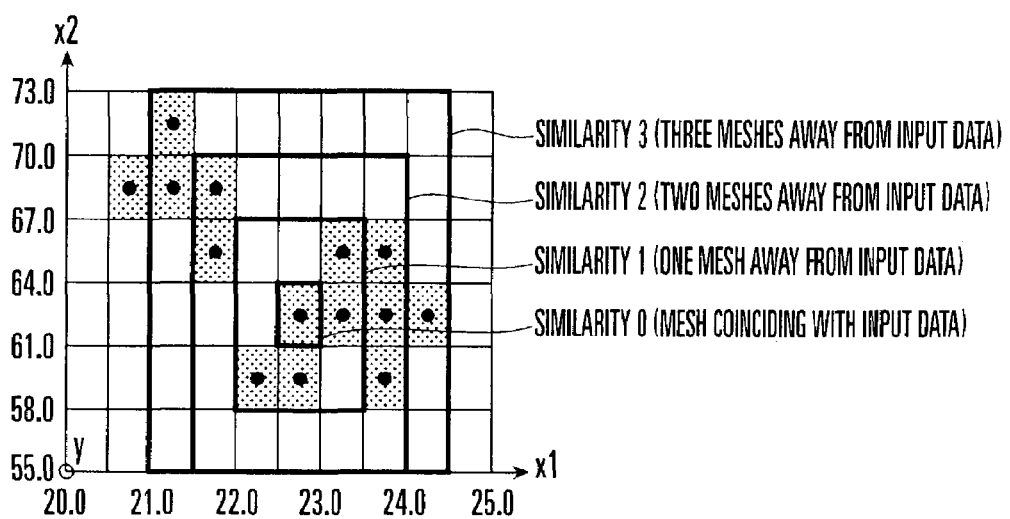
FIG. 13 is a view for explaining the definition of similarity.
Figure 14:
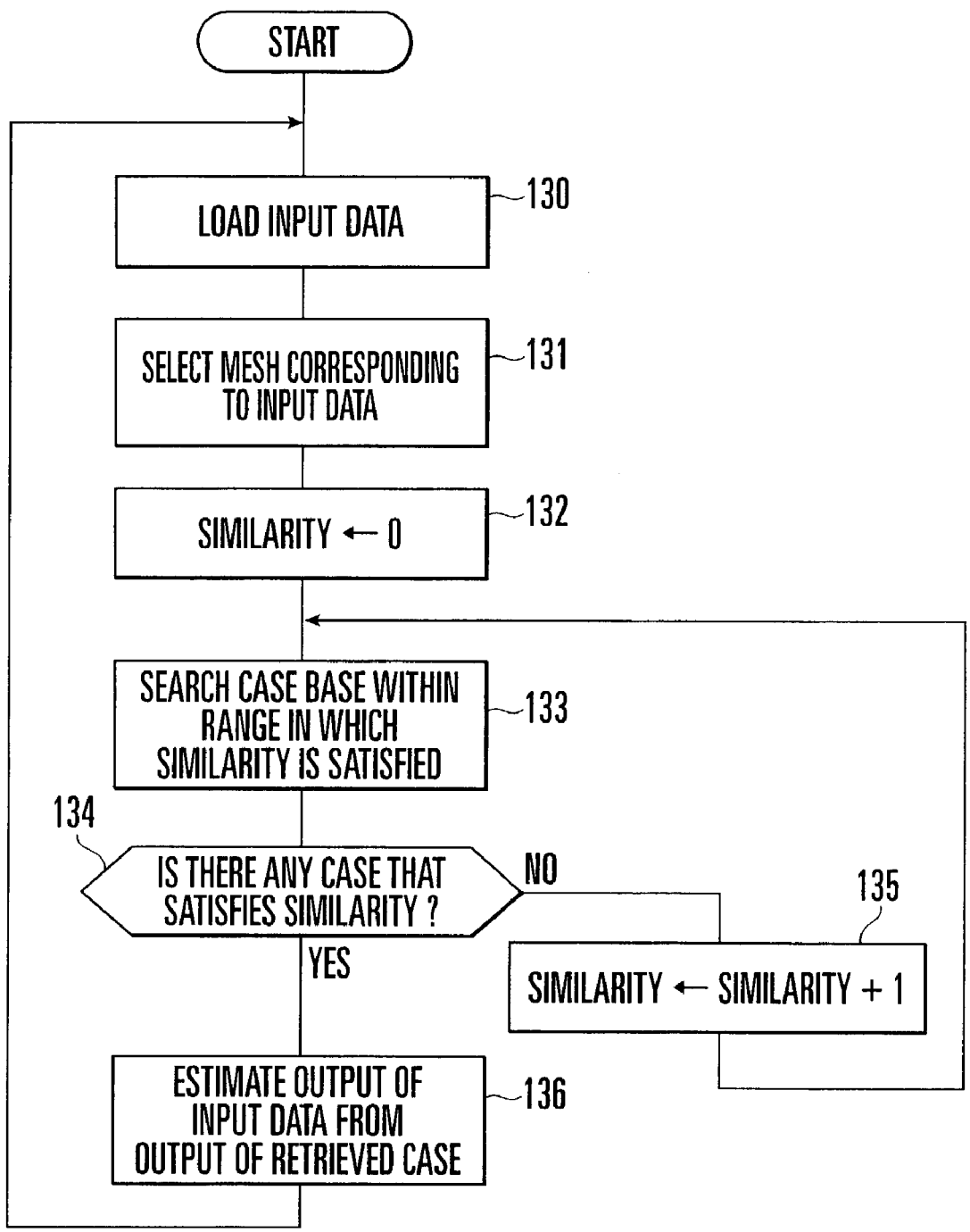
FIG. 14 is a flow chart showing similar case retrieval processing.

Estimation of Output Data: Case Retrieving Section and Output Estimating Section The operation of the soft sensor according to the first embodiment of the present invention will be described next. The soft sensor 1 in FIG. 1 estimates the estimated output data Y (32) from the new input data A (31) by using the case base 11 generated in this manner. First of all, the case retrieving section 12 retrieves similar cases from the case base 11 by using the respective values $X_{01}$ to $X_{0n}$ of the input data A and similarities. FIG. 13 is a view for explaining the definition of a similarity. FIG. 14 is a flow chart showing similar case retrieval processing in the case retrieving section 12. The similarity is a measure that represents the degree of similarity between each case and a mesh of the meshes arranged in the input space of the case base 11, which corresponds to new prediction conditions, i.e., input data.

Referring to FIG. 13, if a case exists in a central mesh corresponding to input data, it is defined that the case and the input data have "similarity r=0". The input data and a case immediately adjacent to the central mesh have "similarity r=1". Subsequently, the similarity increases one by one with an increase in a distance from the central mesh. In performing estimation, therefore, the estimated value based on a case with a similarity r has a precision within $(r+1)\times\epsilon$. In this case, if cases on the two sides of an input value used for estimation are properly used, an output value with a precision higher than $(r+1)\times\epsilon$ can be expected. If only a case on one side of a value for estimation, a precision similar to $(r+1)\times\epsilon$ is expected from the continuity of input and output values.

As shown in FIG. 14, the case retrieving section 12 receives input data (step 130), and selects a mesh corresponding to the input data from the input space which the case base 11 has (step 131). The case retrieving section 12 also initializes the similarity used as a case retrieval range to 0 (step 132), and retrieves a similar case from the case retrieval range indicated by the similarity (step 133). If a case exists in the mesh corresponding to the input data (step 134: YES), this case is output as a similar case (step 136).

If it is determined in step 134 that no case exists in the mesh corresponding to the input data (step 134: NO), the similarity is increased by one to extend the case retrieval range (step 135). The flow then returns to step 133 to retrieve a similar case again.

Figure 15:
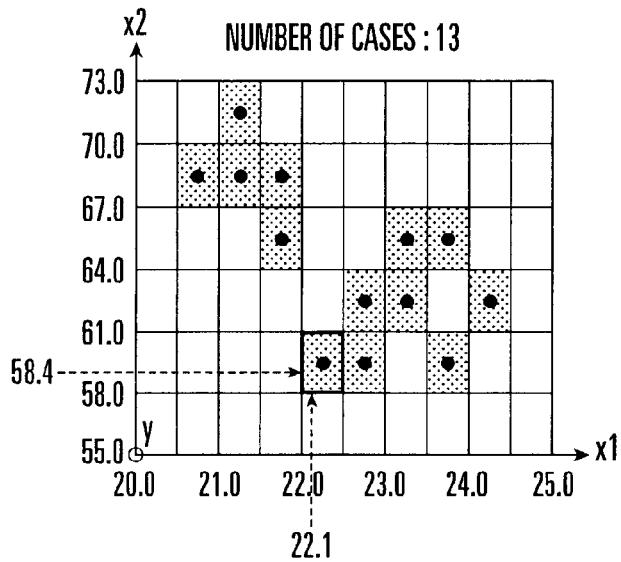
FIG. 15 is a view for explaining output estimating operation (when a similar case exists)

In this manner, the case retrieving section 12 retrieves similar cases corresponding to the new input data from the case base 11. The output estimating section 13 estimates output data Y corresponding to the new input data A on the basis of these similar cases. If, for example, a case exists in a mesh 150 corresponding to input data A (22.1, 58.4) as shown in FIG. 15, output value y=70.2 of this case is selected as an estimated output value.

Figure 16:
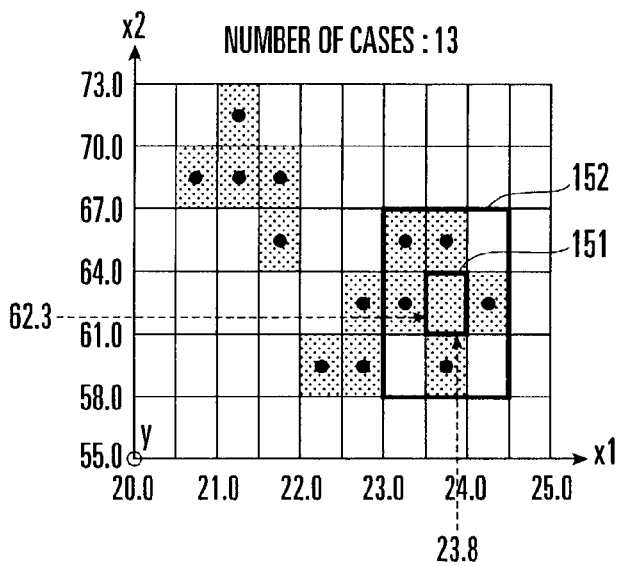
FIG. 16 is a view for explaining output estimating operation (when no similar case exists)

If no case exists in a mesh 151 corresponding to input data A (23.8, 62.3) as shown in FIG. 16, the case retrieving section 12 extends a retrieval range 152 and retrieves a similar case. The output estimating section 13 then calculates estimated output data from the retrieved case. If a plurality of cases are retrieved, the average of the output values of the cases is used as an estimated output value. In this manner, the output estimating section 13 estimates and outputs the estimated output data Y corresponding to the new input data A.

Adaptive Learning: Adaptive Learning Section

The operation of the adaptive learning section will be described next with reference to FIGS. 17 and 18.

As shown in FIG. 1, the adaptive learning section 15 updates the case base 11 on the basis of the history data 34 obtained from the target by actual measurement. In this case, the history data 34 may be automatically obtained, for example, hourly by using a calendar function, temperature sensor, and the like. This makes it possible to automate adaptive learning.

First of all, a case corresponding new data is retrieved from an input space which the case base 11 has. If a case corresponding to the new data exists, only the case is revised. FIG. 17 is a view for explaining adaptive learning operation when a corresponding case exists. In this case, since a case 160 corresponding to new data B (23.9, 66.8, 48.2) exists, new output value y=49.0 of the case is calculated from output value y=48.2 of the new data B and an output value of 49.7 before revision of the case 160. As an output revision arithmetic expression, a forgetting factor $C_{Forget}$ is prepared, and an output value $Y_{old}$ before revision and an output value Y of the new data B are added at the ratio indicated by this forgetting factor to obtain an output value after the revision of the case.

If no case corresponding to the new data exists, a new case is generated on the basis of the new data. FIG. 18 is a view for explaining adaptive learning operation when no corresponding case exists. In this case, since no case exists in a mesh 161 corresponding to new data B (23.7, 62.3, 43.8), a median in the mesh corresponding to the new data B is set as an input value, and a new case 162 having an output value y of the new data B as a representative output value is generated. This case is then added to the case base 54.

As described above, the reasoning model used by the soft sensor 1 according to this embodiment is obtained by applying the framework of a case-based reasoning to modeling, which is based on the concept of topology and can be said to be a modeling technique that can be applied to a general target in which the continuity of an input/output relationship in a system holds.

Data is therefore stored as a case in an identified input space. When an output is to be estimated, the reliability of the estimated output value can be indicated by the topological distance (similarity) between an input and an input case stored in advance. According to the present invention, since a future water distribution amount is estimated by using such a model, the following effects can be obtained as compared with conventional reasoning models such as a neural network and regression model.

According to a conventional reasoning model, 1) since a special model structure is used to define an overall input/output relationship, it takes a lot of trouble to find an optimal structure for the system.

2) When history data are subjected to learning, a convergence calculation must be done to identify a plurality of parameters which a model structure has. An enormous period of time is required for this processing.

3) Even when a model is to be updated on the basis of new data, parameters must be identified. In practice, therefore, adaptive learning is difficult to do.

4) It is difficult to grasp how much a model output value can be trusted with respect to an input value for estimation.

In contrast to this, according to the present invention, 1) since cases (problems and answers) experienced in the past are stored as a case base, and an input/output case incorporating an input/output relationship in the system is used, there is no need to use any special model representing an input/output relationship.

2) When a case base is to be generated, an input space is quantized by using an input quantization level as a parameter to define a case base and similarity, and an evaluation index value is calculated, thereby determining a quantization level. For this reason, no conversion calculation is required. In addition, the perfection degree of the model can be evaluated from this evaluation index value, and hence there is no need to independently evaluate a model by using test data as in the prior art.

3) An answer to a newly input problem is obtained by retrieving a similar case. Since the degree of similarity of the retrieved case to the problem can therefore be determined, this similarity can be used to evaluate the reliability of an output value.

4) Since a case base is constituted by the respective cases, the case base can be partially revised on the basis of the new data, and there is no need to identify parameters as in the prior art. This facilitates adaptive learning.

Note that a problem of learning and a convergence calculation in a conventional model is equivalent to a problem of definition of a case base structure and similarity in case-based reasoning (CBR). In conventional case-based reasoning, such definition cannot be done without sufficient knowledge about a target, posing a serious problem in terms of engineering. According to the case-based reasoning model of the present invention, unique definitions of a case base corresponding to an output allowable error, i.e., a required precision, and similarity are made by quantizing an input space into a topological space on the basis of the concept of continuous mapping in topology. Therefore, an input/output model can be set without sufficient knowledge about a target, i.e., identifying an input/output structure.

Second Embodiment

The evaluation of an output from a soft sensor according to the second embodiment of the present invention will be described with reference to FIG. 1. In this embodiment, in the operation of the soft sensor, an estimation error d with respect to estimated output data Y is calculated by an output evaluating section 14 of a soft sensor 1, and output in real time concurrently with the estimated output data Y.

Evaluation of Output: Output Evaluating Section

As shown in FIG. 13, the reliability of the estimated output data Y is defined by a similarity. The output evaluating section 14 calculates estimation error $d=(r+1)\epsilon$ from a similarity r representing the distance between a mesh corresponding to input data A and a retrieved mesh and an output error allowable width $\epsilon$ per mesh set as a modeling condition on the basis of the retrieval result obtained by a case retrieving section 12. If, therefore, a case exists in the mesh corresponding to the input data A, since the topological distance is 0, i.e., similarity r=0, estimation error $d=\epsilon$. If a case does not exist in the mesh corresponding to the input data A but exists in another nearby mesh, the estimation error contained in the estimated output data Y increases as the similarity r to the another mesh increases.

Since the inherent estimation error d (evaluation error value) contained in each estimated output data Y is calculated by the output evaluating section 14 and output in correspondence with the estimated output data Y, the reliability of each estimated output data Y can be properly evaluated as compared with a statistical evaluation value (average error) as in the prior art. In addition, since estimation errors are output concurrently with the operation of the soft sensor 1, an error in estimated output data can be evaluated in real time.

Third Embodiment

The evaluation of the function of a soft sensor according to the third embodiment of the present invention will be described next with reference to FIG. 1. In this embodiment, in the operation of a soft sensor 1, a function evaluating section 16 evaluates whether the soft sensor 1 is properly functioning, i.e., functioning according to the specifications of the soft sensor which are determined by a desired output error allowable width and topological distance.

Evaluation of Function of Soft Sensor: Function Evaluating Section

A method of evaluating the function of a soft sensor will be described below with reference to FIGS. 19 and 20. FIG. 19 is a view for explaining conditions used for the evaluation of the function of the soft sensor. FIG. 20 is a view for explaining the relationship between the conditions and the evaluation results. The function of the soft sensor is evaluated on the basis of two conditions ① and ② shown in FIG. 19.

With regard to condition ①, the difference (absolute value) between estimated output data Y obtained from an output evaluating section 13 with respect to new input data A on the basis of a case base 11 and output data $Y_{OUT}$ of an externally input true value is compared with a product $(r+1)\epsilon$ of a similarity r+1 used for the estimation of the estimated output data Y and an output error allowable width $\epsilon$, i.e., an estimation error d obtained from an error estimating section 14 with respect to the estimated output data Y, and determines whether $|Y-Y_{OUT}|<(r+1)\epsilon$ is satisfied. If this condition ① holds, since estimation can be done within the required precision range, an evaluation result 36 indicating that the soft sensor is properly functioning is output. At this time, as shown in FIG. 20, the concrete evaluation result 36 that encourages learning of the case base may be output.

Alternatively, an adaptive learning section 15 may be controlled on the basis of this evaluation result, and the case base 11 can be automatically updated. Adaptive learning may be done at the following timing. When the output data of a true value is obtained from a target by actual measurement, learning may be performed by using new history data constituted by the output data of the true value and corresponding input data, i.e., the case base 11 may be partially revised. If similarity r>0, i.e., no case exists in the mesh corresponding to the input data A, adaptive learning may be performed. In adaptive learning, if the separation between the output data of a case in the past and the output data of a true value is large, the case in the past may be discarded, and the output data of the true value may be used as a new case. Alternatively, instead of sequentially performing learning when the output data of a true value is obtained, for example, learning may be collectively performed when new history data to be learnt are generated to a certain extent.

With regard to condition ②, the difference (absolute value) between the estimated output data Y obtained from the output evaluating section 13 with respect to the new input data A on the basis of the case base 11 and the output data $Y_{OUT}$ of the externally input true value is compared with the product $(r+1)\epsilon$ of the similarity r+1 used for the estimation of the estimated output data Y and the output error allowable width $\epsilon$, i.e., the estimation error d obtained from an error estimating section 14 with respect to the estimated output data Y, and determines whether $|Y-Y_{OUT}|<(r+1)\epsilon$ is satisfied. If this condition ② holds, since estimation is not performed within the required precision range, the evaluation result 36 indicating that the soft sensor is not properly functioning is output. At this time, as shown in FIG. 20, if, for example, condition ② unexpectedly holds, the concrete evaluation result 36 indicating the possibility of temporary noise may be output. If, for example, condition ② frequently holds, the concrete evaluation result 36 indicating the revision of the output error allowable width and input variable selection may be output.

In this manner, evaluation is performed by comparing the difference between the estimated output data Y with respect to the input data A and the output data $Y_{OUT}$ of the true value with $(r+1)\epsilon$, i.e., the output error d. This makes it possible to accurately and properly evaluate whether the soft sensor is properly functioning, i.e., the soft sensor is functioning according to its specifications determined by a desired output error allowable width and topological distance.

Fourth Embodiment

Figure 21:
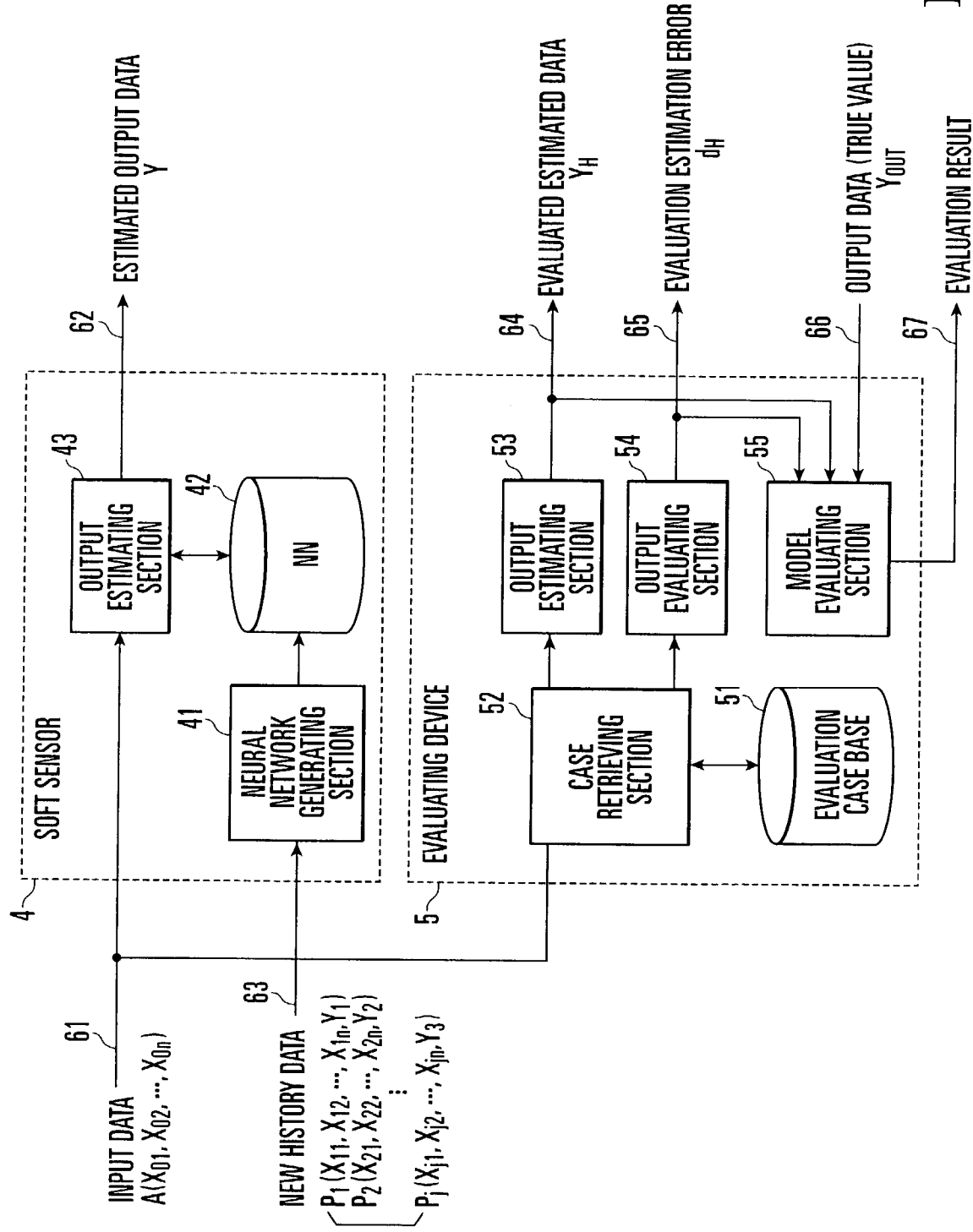
FIG. 21 is a functional block diagram showing a soft sensor evaluating device according to the fourth embodiment of the present invention.

The third embodiment has exemplified the case wherein the function of the soft sensor for estimating output data by using a case base is evaluated. The fourth embodiment will exemplify the case wherein the function of a soft sensor using an arbitrary reasoning engine is externally and indirectly evaluated. FIG. 21 is a functional block diagram showing an evaluating device for evaluating a soft sensor for estimating output data by using a neural network (NN). This soft sensor 4 includes a neural network generating section 41 for generating a neural network 42 on the basis of history data $P_1$ to $P_j$ (63), and an output estimating section 43 for estimating output data corresponding to input data A (61) by using the neural network 42 generated by the neural network generating section 41, and outputting the data as estimated output data Y (62). Although the soft sensor using a neural network as a reasoning engine will be described as an example, the present invention can also be applied to a case wherein a soft sensor using another model, e.g., a linear model or nonlinear model, or the above case base, as a reasoning engine is externally evaluated.

Evaluation of Function of Soft Sensor: Evaluating Device

An evaluating device 5 for evaluating the function of the soft sensor 4 includes an evaluation case base 51, case retrieving section 52, output estimating section 53, output evaluating section 54, and function evaluating section 55. Each of these components corresponds to each component of the soft sensor 1 in FIG. 1, and operates in almost the same manner. More specifically, the evaluation case base 51 corresponds to the case base 11. Note that the evaluation case base 51 is generated in advance by, for example, the case base generator 2 shown in FIG. 2 by using the same history data 63 as that used when the neural network (NN) 42 of the soft sensor 4 is generated. In addition, the case retrieving section 52, output estimating section 53, output evaluating section 54, and function evaluating section 55 respectively correspond to the case retrieving section 12, output estimating section 13, output evaluating section 14, and function evaluating section 16 of the soft sensor 1.

The operation of the evaluating device 5 will be described next. This evaluating device 5 operates concurrently with the soft sensor 4. The input data A input to the soft sensor 4 is also input to the case retrieving section 52 of the evaluating device 5. The case retrieving section 52 retrieves at least one case corresponding to the input data A by using the evaluation case base 51. The output estimating section 53 calculates output data corresponding to the input data A on the basis of the output value of the retrieved case, and outputs it as evaluated estimated data $Y_H$ (64). The output evaluating section 54 calculates an estimation error in the evaluated estimated data $Y_H$ on the basis of the similarity used in the case retrieval by the case retrieving section 52, and outputs the calculated error as evaluation estimation error $d_H$ (65). As in the manner described above, this evaluation estimation error $d_H$ is output, for each evaluated estimated output data $Y_H$ corresponding to the input data A, as data representing its estimation error.

Evaluation of Function of Soft Sensor: Function Evaluating Section

The function evaluating section 55 evaluates the function of the soft sensor 4 using the neural network 42 by using the evaluated estimated data $Y_H$ from the output estimating section 53, the evaluation estimation error $d_H$ from the output evaluating section 54, and output data $Y_{OUT}$ (66) of the true value actually measured from the target by, for example, a hard sensor. This evaluating operation is the same as that of the function evaluating section 16 described above, in which evaluation is performed by using the conditions shown in FIG. 18, and an evaluation result 67 is output on the basis of the relationship shown in FIG. 19. Assume that in each condition in FIG. 18, the evaluated estimated output data $Y_H$ is used in place of the estimated output data Y, and the evaluation estimation error $d_H$ corresponds to (r+1)ε instead of the estimation error d. A detailed description of this evaluating operation will be omitted.

In this manner, an evaluation case base is generated in advance from the same history data as that used for the generation of the reasoning model for the soft sensor, and the evaluating device designed to operate concurrently with the soft sensor calculates evaluated estimated output data and evaluation estimation error with respect to the same input data as that input to the soft sensor. The function of the soft sensor is evaluated by using these data. Even a soft sensor using any type of reasoning engine can therefore be indirectly evaluated, on the basis of the estimation precision that can be provided by the evaluation case base, whether the soft sensor is properly functioning.

Fifth Embodiment

The fourth embodiment has exemplified the evaluating device which evaluates the function of a soft sensor using an arbitrary reasoning model at the time of operation by concurrently performing estimating operation using a separately generated evaluation case base. The fifth embodiment will exemplify the case wherein the function of a soft sensor is evaluated when a reasoning model used by the soft sensor is generated, instead of when the soft sensor operates.

The evaluation case base 51 used in the evaluating device shown in FIG. 21 is generated by the case base generator 2 shown in FIG. 2 by using the history data 67 used when the neural network 42, i.e., the reasoning model in this case, for the soft sensor 4. At this time, as described in the first embodiment, the model feasibility of the target by the neural network 42 used in the soft sensor 4 can be evaluated on the basis of the determinations made by the output distribution condition determining means 21A and continuity condition determining means 21B of the input quantizing section 21, so the case base generator in FIG. 2 can be regarded as a model evaluating device. In this evaluation, the indexes obtained by the output distribution condition determining means 21A and continuity condition determining means 21B, i.e., the output distribution condition sufficiency ratio and continuity condition sufficiency ratio, are determined by referring to the evaluation reference in FIG. 10 in the same manner described above. A detailed description of this operation will be omitted.

In this manner, in the input quantizing section 21, the output distribution condition sufficiency ratio and continuity condition sufficiency ratio are determined to evaluate whether the target can be modeled with a desired precision by using the history data, and an evaluation result 40 is output. If, therefore, modeling based on the required precision cannot be done at the time of generation of an evaluation case base, it can be determined that the same problem will arise in an arbitrary reasoning model for the soft sensor which is generated by using the same history data. This makes it possible to take concrete measures on the basis of the evaluation result 40, i.e., appropriate measures, such as reviewing of input variable selection, reviewing of measurement points, and reviewing of noise removable processing for the history data. Although this embodiment has exemplified the soft sensor using the neural network, the present invention is not limited to this. In a soft sensor using any type of reasoning engine, the model feasibility of a target can be properly evaluated.

INDUSTRIAL APPLICABILITY

As is obvious from the above description, the soft sensor according to the present invention includes a case base generated by receiving a plurality of history data each constituted by a set of input data obtained for a plurality of input variable required for estimation and actual output data obtained from the target by using the input data as input conditions, forming a plurality of unit input spaces by quantizing an input space of the case base in accordance with a desired output allowable error, arranging the respective history data in the corresponding unit input spaces, and generating, for each unit input space having not less than one history data, a case representing the history data in the unit input space, a case retrieving section which acquires, by searching the case base, a case from each of not less than one unit input space which has a case and is located at a minimum topological distance from a unit input space corresponding to a new set of input data, and an output estimating section which estimates output data corresponding to the new set of input data. This output estimating section calculates output data corresponding to the new set of input data from the output data of the case retrieved by the case retrieving section and outputs the data as estimated output data. The output data actually detected from the identification target can be estimated as estimated output data each having an accurate evaluation value within a short period of time.

In addition, another soft sensor according to the present invention further includes an output evaluating section which calculates an error contained in the estimated output data. This output evaluating section calculates an error contained in the estimated output data output from the output estimating section on the basis of the output allowable error and a topological distance between the unit input space corresponding to the new set of input data and the unit input space of the case retrieved by the case retrieving section, and outputs the error as an estimation error corresponding to the estimated output data. This makes it possible to clearly present the estimation error contained in each estimated output data.

In another soft sensor according to the present invention, since the function evaluating section performs evaluation by using the estimation error from the output evaluating section, the estimated output data from the output estimating section, and the output data of the true value obtained from the target, it can be properly evaluated whether the soft sensor is properly functioning.

A soft sensor evaluating device according to the present invention includes an evaluation case base which is used when a reasoning model for the soft sensor is to be generated and generated by receiving a plurality of history data each constituted by a set of input data obtained for a plurality of input variable required for estimation and actual output data obtained from the target by using the input data as input conditions, forming a plurality of unit input spaces by quantizing an input space of the case base in accordance with a desired output allowable error, arranging the respective history data in the corresponding unit input spaces, and generating, for each unit input space having not less than one history data, a case representing the history data in the unit input space, a case retrieving section which acquires, by searching the evaluation case base, a case from each of not less than one unit input space which has a case and is located at a minimum topological distance from a unit input space corresponding to a new set of input data input to the soft sensor, an output estimating section which calculates output data corresponding to the new set of input data from the output data of the case retrieved by the case retrieving section and outputs the data as evaluated estimated output data, an output evaluating section which calculates an error contained in the estimated output data output from the output estimating section on the basis of the output allowable error and a topological distance between the unit input space corresponding to the new set of input data and the unit input space of the case retrieved by the case retrieving section, and concurrently outputs the error as an evaluation estimation error for each estimated output data, and a function evaluating section which evaluates the soft sensor. The function evaluating section performs evaluation by using the evaluation estimation error from the output evaluating section, the evaluated estimated output data from the output estimating section, and output data of a true value obtained from the target. With regard to even a soft sensor using any type of reasoning mode, therefore, it can be indirectly evaluated whether the soft sensor is properly functioning.

Another soft sensor evaluating device of the present invention includes a function evaluating section to evaluate whether the soft sensor is properly functioning, by comparing a difference between the evaluated estimated output data obtained by the output estimating section in correspondence with the new set of input data and the output data of the true value obtained from the target with the evaluation estimation error corresponding to the evaluated estimated output data. Therefore, it can be indirectly evaluated, on the basis of the estimation precision that can be provided by the evaluation case base, whether the soft sensor is properly functioning.

Another soft sensor evaluating device according to the present invention includes an input quantizing section which receives a plurality of history data each constituted by a set of input data obtained for a plurality of input variables required for estimation and actual output data obtained from a target by using the input data as input conditions, and forms a plurality of unit input spaces by quantizing an input space of a case base in accordance with a desired output allowable error, output distribution condition determining means for determining whether each of the unit input spaces formed by the input quantizing section satisfies a condition that a variation in output data between history data arranged in the unit input space falls within a desired output allowable error, and calculates and outputs a sufficiency ratio of unit input spaces satisfying the condition as an output distribution condition sufficiency ratio, and continuity condition determining means for determining whether each of the unit input spaces formed by the input quantizing section satisfies a condition that a difference between output data of representative history data representing history data arranged in the unit input space and an average value of output data of representative history data of not less than one unit input space which is located at a minimum topological distance from the unit input space and in which history data is arranged falls within an output allowable error corresponding to the topological distance, and calculates and outputs a sufficiency ratio of unit input spaces satisfying the condition as a continuity condition sufficiency ratio. The input quantizing section evaluates the reasoning model generated by using the history data on the basis of the output distribution condition sufficiency ratio and continuity condition sufficiency ratio. With regard to even a soft sensor using any type of reasoning engine, the model feasibility of a target can be properly evaluated when a reasoning model for the soft sensor is generated.

The invention claimed is:
1. A soft sensor, comprising:
a case base to store a plurality of cases in an input space which is quantized into a plurality of unit input spaces, each case including history data in a corresponding unit input space, the history data being constituted by input data and associated output data obtained in advance from a physical target, the input space being quantized such that the output data associated with the input data in each unit input space satisfies a desired output allowable error, the case base being adaptable in real time to a new data set including new input data and associated new output data received from the physical target to update the cases stored in the case base;
a case retrieving section which acquires, by searching said case base, a retrieved case from one of the unit input spaces having at least one of the cases, the one of the unit spaces being located at a minimum topological distance from a new unit input space corresponding to a new set of input data;

an output estimating section which calculates new output data corresponding to the new set of input data from the retrieved case and outputs an output estimation of a physical output quantity of the physical target;

an output evaluating section which calculates an estimation error contained in the output estimation output from said output estimating section on the basis of the output allowable error and a topological distance between the new unit input space corresponding to the new set of input data and the unit input space of the retrieved case, and outputs the estimation error corresponding to the output estimation; and a function evaluating section which, when the new set of input data corresponds to the unit input space having no case, uses the output estimation obtained from said output estimating section in correspondence with the new set of input data and, a true output value obtained from the physical target, and the estimation error corresponding to the output estimation to evaluate whether said soft sensor is properly functioning.

2. A soft sensor evaluating device for evaluating a soft sensor which arithmetically processes a set of input values for a plurality of input variables representing a behavior of a physical target by using a reasoning model to estimate a physical output quantity actually detected from the physical target, the soft sensor evaluating device comprising:

an evaluation case base which is used when the reasoning model for said soft sensor is to be generated, said evaluation case base storing a plurality of cases in an input space which is quantized into a plurality of unit input spaces, each case including history data in a corresponding unit input space, the history data being constituted by input data and associated output data obtained in advance from the physical target, the input space being quantized such that the output data associated with the input data in each unit input space satisfies a desired output allowable error, the evaluation case base being adaptable in real time to a new data set including new input data and associated new output data received from the physical target to update the cases stored in the evaluation case base;

a case retrieving section which acquires, by searching said evaluation case base, a retrieved case from one of the unit input spaces having at least one of the cases, the one of the unit spaces being located at a minimum topological distance from a new unit input space corresponding to a new set of input data input to said soft sensor;

an output estimating section which calculates new output data corresponding to the new set of input data from the output data of the retrieved case and outputs an evaluated estimation of the physical output quantity of the physical target;

an output evaluating section which calculates an evaluation estimation error contained in the evaluated estimation output from said output estimating section on the basis of the output allowable error and a topological distance between the new unit input space corresponding to the new set of input data and the unit input space of the retrieved case, and outputs the evaluation estimation error corresponding to the evaluated estimation;

a function evaluating section which evaluates whether said soft sensor is properly functioning, by using the evaluation estimation error from said output evaluating section, the evaluated estimation from said output estimating section, and a true output value obtained from the physical target;

wherein said function evaluating section evaluates whether said soft sensor is properly functioning, by using the evaluated estimation obtained from said output estimating section in correspondence with the new set of input data, the true output value obtained from the physical target, and the evaluation estimation error corresponding to the evaluated estimation;

an input quantizing section which is used when the reasoning model for the soft sensor is to be generated, the input quantizing section receiving a plurality of history data each constituted by input data and associated actual output data obtained from the physical target by using the input data as input conditions, and forming a plurality of unit input spaces by quantizing an input space of a case base in accordance with a desired output allowable error, wherein said input quantizing section has output distribution condition determining means for determining whether each of the unit input spaces satisfies a first condition that a variation in the output data associated with the input data in the unit input space falls within the desired output allowable error, and calculating and producing an output distribution condition sufficiency ratio of the unit input spaces satisfying the first condition, continuity condition determining means for determining whether each of the unit input spaces satisfies a second condition that a difference between the output data of first representative history data in the unit input space and an average value of the output data of second representative history data of at least one neighboring unit input space which is located at a minimum topological distance from the unit input space falls within an output allowable error corresponding to the minimum topological distance, and calculating and outputting a continuity condition sufficiency ratio of the unit input spaces satisfying the second condition, and wherein said input quantizing section evaluates model feasibility of the physical target by the reasoning model generated by using the history data on the basis of the output distribution condition sufficiency ratio and continuity condition sufficiency ratio.

3. A computer-implemented method of estimating output data to be detected actually from a target in accordance with a set of input data obtained for a plurality of input variables representing a behavior of the target to provide estimated output data, by arithmetically processing said set of input data through the use of a predetermined reasoning model, comprising the steps of:

capturing a plurality of history data, each constituted by a set of input data obtained for a plurality of input variables required for the estimation and actual output data obtained from the target by using the input data as an input condition;

quantizing an input space of a case base in accordance with a desired allowable output error to form a plurality of unit input spaces;

allocating the respective history data in corresponding ones of the thus formed unit input spaces;

generating a case representing the history data in the unit input space for each unit input space containing at least one history data;

searching the thus generated case base to acquire a unit input space at a shortest topological distance from a unit input space corresponding to a new set of input data;

calculating output data corresponding to said new set of input data from output data of a case corresponding to the thus acquired unit input space to provide the thus calculated output data as estimated output data;

calculating an estimation error contained in the thus provided estimated output data based on the allowable output error and a topological distance between the unit input space corresponding to the new set of input data and the unit input space acquired above; and comparing an error between the estimated output data corresponding to the new set of input data and output data of a true value obtained from the target with the calculated estimation error contained in the estimated output data to evaluate whether an output data estimating function is normal.

* * * * *